US011511303B2

(12) United States Patent
Martin et al.

(10) Patent No.: US 11,511,303 B2
(45) Date of Patent: Nov. 29, 2022

(54) SYSTEM AND METHOD FOR COATING WORKPIECES

(71) Applicant: STURM MASCHINEN-& ANLAGENBAU GMBH, Salching (DE)

(72) Inventors: Carlos Martin, Deggendorf (DE); Roland Baier, Bad Abbach (DE)

(73) Assignee: STURM MASCHINEN-& ANLAGENBAU GMBH, Salching (DE)

( * ) Notice: Subject to any disclaimer, the term of this patent is extended or adjusted under 35 U.S.C. 154(b) by 0 days.

(21) Appl. No.: 17/003,439

(22) Filed: Aug. 26, 2020

(65) Prior Publication Data

US 2021/0069740 A1 Mar. 11, 2021

(30) Foreign Application Priority Data

Sep. 9, 2019 (EP) ..................................... 19196156

(51) Int. Cl.
*B05B 13/02* (2006.01)
*B05B 12/12* (2006.01)
(Continued)

(52) U.S. Cl.
CPC .......... *B05B 13/0221* (2013.01); *B05B 12/12* (2013.01); *B05B 15/50* (2018.02);
(Continued)

(58) Field of Classification Search
USPC ............. 118/324, 712, 313–315, 686, 56, 66
See application file for complete search history.

(56) References Cited

U.S. PATENT DOCUMENTS 6,235,634 B1 * 5/2001 White ............... H01L 21/67167
438/680
6,614,050 B1 9/2003 Yamada et al.
(Continued)

FOREIGN PATENT DOCUMENTS

CN 107309130 A 11/2017
DE 102006046968 A1 4/2008
(Continued)

OTHER PUBLICATIONS

English Translation DE102006046968A1 (Year: 2008).*
(Continued)

*Primary Examiner* — Yewebdar T Tadesse
(74) *Attorney, Agent, or Firm* — Studebaker & Brackett PC

(57) ABSTRACT

The invention relates to a system and to a method for coating workpieces using a coating device, which is designed to apply a metal coating to a surface of the workpiece. According to the invention, it is provided that a plurality of coating devices, which are designed as identical coating modules, are provided and are arranged in a module group, that an input measuring station is assigned to the module group, by means of which station a surface of the face of the workpiece to be coated can be detected, that a conveying apparatus is provided, by means of which a workpiece can be supplied to one of the coating modules from the input measuring station, and that an output measuring station is assigned to the module group, by means of which station a surface of the coated face of the workpiece can be detected.

11 Claims, 3 Drawing Sheets

(51) Int. Cl.
  *B05B 15/50*   (2018.01)
  *B23K 26/342*  (2014.01)
  *B23K 26/354*  (2014.01)
  *B23K 26/08*   (2014.01)
  *B23K 26/12*   (2014.01)

(52) U.S. Cl.
  CPC ............ *B23K 26/08* (2013.01); *B23K 26/342* (2015.10); *B23K 26/354* (2015.10); *B23K 26/127* (2013.01)

(56) References Cited

U.S. PATENT DOCUMENTS

| | | |
|---|---|---|
| 2005/0186327 A1 | 8/2005 | Saito et al. |
| 2012/0282713 A1 | 11/2012 | Tanaka et al. |
| 2017/0349991 A1* | 12/2017 | Ebenbeck ................. C23C 4/16 |
| 2018/0038008 A1 | 2/2018 | Mitsuya et al. |
| 2018/0180125 A1* | 6/2018 | Hollis ..................... C23C 24/04 |

FOREIGN PATENT DOCUMENTS

| | | |
|---|---|---|
| EP | 0905745 A2 | 3/1999 |
| EP | 3048181 B1 | 12/2018 |
| JP | H11-224894 A | 8/1999 |
| JP | 2001-196283 A | 7/2001 |
| JP | 2011-133797 A | 7/2011 |
| JP | 2018-024899 A | 2/2018 |
| WO | 2009018841 A1 | 2/2009 |

OTHER PUBLICATIONS

An Office Action mailed by the Japanese Patent Office dated Nov. 24, 2021, which corresponds to Japanese Patent Application No. 2020-148724 and is related to U.S. Appl. No. 17/003,439; with English language translation.

\* cited by examiner

SYSTEM AND METHOD FOR COATING WORKPIECES

The invention relates to a system for coating workpieces, in particular brake discs or brake drums, using a coating device, which is designed to apply a metal coating to a surface of the workpiece, according to the preamble of claim 1.

Furthermore, the invention relates to a method for coating workpieces.

Systems and methods for coating workpieces using a coating device, by means of which a metal coating is applied to a workpiece surface, have been known for long time. Coating devices of this kind are used in the coating of cylinder bores in engine blocks, for example, with a plasma spraying method, a thermal spraying method or another metal-coating method being used.

EP 3 048 181 B1 of the applicant, discloses a system and a method for metal-coating workpieces, in which an engine block comprising cylinder bores to be coated is arranged on a rotary table, by means of which the workpiece can be swivelled between a loading station and a processing station. In this process, the engine block is received in the loading station, with the cylinder bores being measured using a measuring apparatus. The engine block is then swivelled into the coating position, with a metal coating being applied to the cylindrical bore surfaces by means of plasma spraying. At the same time, when swivelling the engine block into the coating position, an engine block that has finished being coated is swivelled back into the loading position. In the process, the coated engine block is measured using the measuring apparatus before being unloaded from the loading station.

In the loading station, the thus coated surfaces of the engine block are measured again by the measuring apparatus, such that coating defects can be directly identified, for example.

In this known prior art, measuring and coating can be carried out in a single device, with only one measuring apparatus being required per coating device. As a result, the large and relatively expensive engine blocks can be processed efficiently and with high coating quality and coating reliability.

The invention is based on the object to provide a system and a method for coating workpieces, by means of which increased efficiency can be achieved even with relatively small workpieces.

According to the invention, the object is solved both by a system having the features of claim 1 and by a method. Preferred embodiments of the invention are set out in the dependent claims.

The system according to the invention is characterised in that a plurality of coating devices, which are designed as identical coating modules, are provided and are arranged in a module group, in that an input measuring station is assigned to the module group, by means of which station a surface of the face of the workpiece to be coated can be detected, in that a conveying apparatus is provided, by means of which a workpiece can be supplied to one of the coating modules from the input measuring station, and in that an output measuring station is assigned to the module group, by means of which station a surface of the coated face of the workpiece can be detected.

A basic concept of the invention can be considered that for increasing the efficiency a large number of substantially identically constructed coating modules is provided which form a module group. According to the invention, a measuring station is not assigned to a single coating module, but rather a common input measuring station and a common output measuring station are assigned to the module group as a whole. This ensures a largely consistent measurement of the workpieces before and after the processing. A large number of workpieces having comparable quality can thus be obtained. An increased level of availability is achieved alongside efficient costs for the system design, since, if one of the maintenance-intensive coating devices malfunctions, it can be readily replaced by another coating module, with the measuring stations still being able to be used. Using the system, in particular low-abrasion and/or particularly corrosion-resistant mass-produced components can be produced, for example brake discs or brake drums comprising metal brake surfaces.

The conveying apparatus can be designed in any manner, and can comprise one or more handling robots, for example.

A particularly compact and robust design is achieved according to a development of the invention by the conveying apparatus comprising a linear conveyor, along which the individual coating modules are arranged. The workpiece to be processed can thus pass by the individual coating modules until it is supplied to a selected coating module by a separate handling or supply unit, for example.

In principle, the input measuring station and the output measuring station can be combined and can themselves comprise one or more measuring apparatuses. According to a variant of the invention, it is particularly preferable, in a conveying direction of the linear conveyor, for the input measuring station to be arranged upstream of the module group and for the output measuring station to be arranged downstream of the module group. In this way, a directed material flow within a manufacturing system can be achieved. Here, the manufacturing system can include pre-processing of the workpieces, for example by means of machining, roughening a surface, cleaning the surface or similar processing procedures. Other processing stations can be arranged downstream of the system for coating.

For a largely automatic workflow, according to a development of the invention, it is advantageous for at least one handling apparatus, in particular a multi-axis gripper, to be provided, by means of which the workpiece can be supplied to the input measuring station and/or to the conveying apparatus and/or to the output measuring station. Therefore, for example, a handling apparatus can be arranged upstream of the input measuring station, by means of which apparatus the workpiece is supplied from a main conveying apparatus to the input measuring station, for example, and, after the measurement, is transferred from the input measuring station to the conveying apparatus, and to the individual coating modules. In a similar manner, an additional handling apparatus can be arranged upstream of the output measuring station, which apparatus takes the workpiece from the conveying apparatus and supplies it to the output measuring station, and, optionally, the workpiece is supplied to the main conveying apparatus again after the measurement in the output measuring station. Additional handling apparatuses, for example multi-axis grippers or simple supply conveyors, can be arranged even at the individual coating modules in order to supply a workpiece from the conveying apparatus, in particular the linear conveyor, to the selected coating module. The workpiece can be clamped onto a transport pallet, the workpiece being measured, coated and conveyed in the clamped position.

Another embodiment of the invention is characterised in that a control apparatus is provided, which is designed to control the conveying apparatus to supply a particular workpiece to a particular coating module, and in that the control apparatus is further designed to control the particular coating module to apply the metal coating to the workpiece on the basis of measured values of the particular workpiece which have been detected in the input measuring station. In this process, the system is controlled overall by the control apparatus. After measuring a workpiece, the measured values obtained, which in particular include a surface structure showing a contour of the peaks and troughs along the surface, are fed from the control apparatus to the coating module which is free and has been determined and selected by the control apparatus for carrying out the coating. The data can be transmitted to and loaded into a sub-control unit of the respective coating module from the control apparatus of the total system. A desired coating on the workpiece can be executed dependent of the values from the input measurement.

After the coating is complete, the coated workpiece is measured for a final time, with the measured values, which in particular likewise include a surface contour and a thick deposit on the surface, being fed to the control apparatus. The control apparatus can compare the input values and output values and can relate them to values relating to the coating by the respective coating module. As a result, it can for example be determined whether the workpiece has been properly coated or whether a defect or at least undesired deviations have occurred during the coating in a particular coating module. This makes it possible to identify defects or deviations that do occur at an early stage and in particular also to identify a tendency towards dimensional deviations in a particular coating module in good time before the occurrence of rejects, in order to change parameters in a coating module during the coating process or to initiate timely maintenance of a coating module.

According to a variant of the invention, another improvement can be achieved by each coating module comprising a supporting frame and being arranged interchangeably in the module group. In a simple case, the supporting frame can consist here of a pallet-like base plate and/or a box-like frame. These make it possible to move a coating module using a forklift truck or indoor crane. Therefore, a coating module can be replaced with a new coating module in an efficient manner, for example. Capacity adjustments can also be made easily by adding additional coating modules or by transporting away coating modules that are not needed.

In principle, the coating modules in a module group can be arranged in any desired manner. According to a development of the invention, it is advantageous for the coating modules in a module group to be arranged in parallel with one another. This parallel arrangement does not necessarily relate to a parallel spatial arrangement. Instead, the term should be considered in contrast to a series arrangement, with the individual coating modules being positioned beside one another in the parallel arrangement and being able to carry out coatings in parallel with one another.

According to a development of the invention, a further increase in flexibility during capacity adjustments is achieved by a plurality of module groups each being provided with an input measuring station and an output measuring station and being arranged in parallel with one another. In this way, a large number of workpieces can also be coated in parallel at the same time by two or more module groups that each comprise a plurality of coating modules. For larger capacity modifications, additional module groups can thus be added or disconnected from a total system.

It is particularly advantageous here for a main conveying apparatus to be provided for supplying the workpieces to the at least one module group and for discharging said workpieces therefrom. The main conveying apparatus interconnects the individual module groups, which are arranged in a parallel arrangement relative to one another. The main conveying apparatus may in particular be a linear conveyor, for example a transport conveyor comprising circulating conveyor belts.

A preferred embodiment of the invention further consists in that a post-processing station is assigned to the one module group or the plurality of module groups, which station is designed for the material-removing processing of the coated surface of the workpiece. The material-removing processing may in particular include grinding, honing, lapping or polishing of the applied metal coating.

Another advantageous variant of the invention can be considered that the control apparatus being designed for controlling the post-processing station on the basis of the measured values of the coated workpiece, which have been detected by the output measuring station through which the workpiece has passed. In particular, a layer height and irregularities in the coating can be transmitted to the post-processing station by the control apparatus in the process. A sub-control unit in the post-processing station can provide effective post-processing on the basis of these measured values from the output measuring station.

With regard to the method according to the invention for coating workpieces using the above-described system, it is provided that the workpiece to be coated is supplied to an input measurement, in which a surface of a face of the workpiece to be coated is detected, the workpiece is guided to one of the coating modules in a module group by means of a conveying apparatus, in which module group a metal coating is applied to the surface of the workpiece to be coated, and the coated workpiece is supplied to an output measuring station, in which the coated surface of the workpiece is detected.

Using this method, the above-described system can be operated according to the invention. The above-described advantages can be achieved thereby.

The coating may be a suitable coating method, in particular a laser deposition welding, a plasma spraying, a thermal spraying method or the like.

Using the method according to the invention, in particular brake discs or brake drums or other brake components as mass-produced components can be efficiently provided with an abrasion-resistant and/or corrosion-resistant metal coating. By means of brake components of this kind, an abrasion during the braking and therefore a release of particulate matter can be significantly reduced.

The invention is explained in greater detail in the following on the basis of preferred embodiments shown schematically in the drawings, in which.

Figure 1:
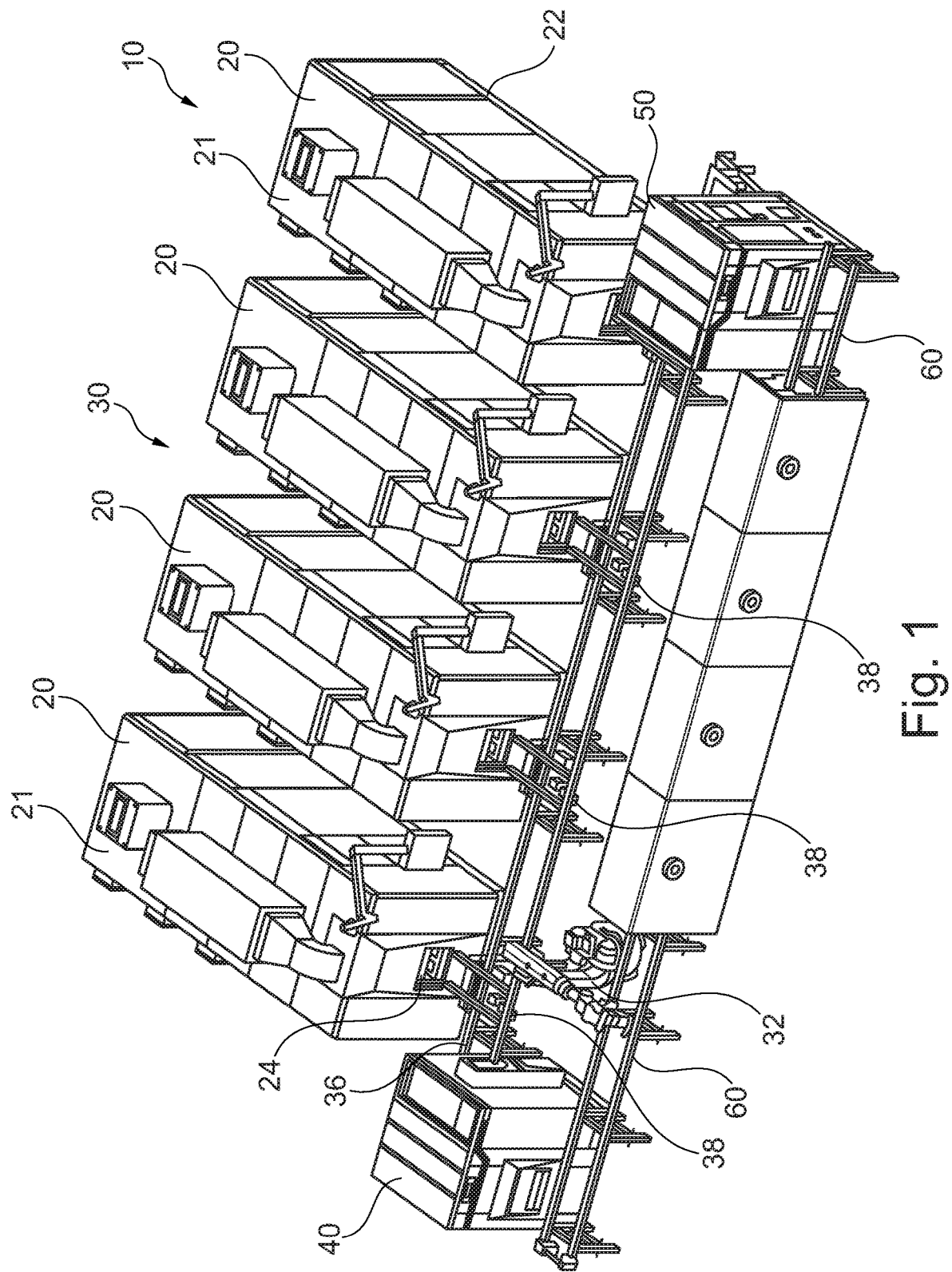
FIG. 1 is a schematic view of a system according to the invention comprising a module group.

A first embodiment of a system 10 according to the invention is shown in FIG. 1. Said system comprises four coating modules 20, which form a module group 30 in a parallel arrangement beside one another. An input measuring station 40 is upstream of the module group 30, to which station workpieces (not shown here) are conveyed by means of a main conveying apparatus 60. By means of a handling apparatus 32, which is configured in the present, exemplary embodiment as a multi-axis robot, the workpieces are picked up from the main conveying apparatus 60 and supplied to the box-shaped input measuring station 40.

The workpieces, in particular a surface to be coated, are measured in the input measuring station 40. In this process, a surface structure of the face to be coated can in particular be detected, with peaks and troughs in the surface in particular being detected and measured.

The measured workpiece can then be transferred out of the input measuring station 40 via the handling apparatus 32, or directly out of the input measuring station 40, to a linear conveying apparatus 36 which runs along the coating modules 20. A supply apparatus 38 is arranged on the conveying apparatus 36, designed as a linear conveyor, upstream of each coating module 20, by means of which supply apparatus a workpiece is introduced into an inlet opening 24 in a box-shaped housing 21 of the selected coating module 20.

The coating modules 20 are designed to be the same or substantially the same and comprise a transport frame 22. With this transport frame 22, the coating modules 20 can be moved and relocated by means of an indoor crane or forklift truck. This makes it possible, for example in the event of a capacity change, to add or remove additional coating modules 20 or to replace an existing coating module 20 with a new coating module 20 for repair or maintenance purposes.

In the coating module 20, at least one surface of the workpiece 20 is provided with a metal coating, as will be explained in greater detail in the following in conjunction with FIG. 2. After the coating, the workpiece is guided back through the inlet opening 24 onto the conveying apparatus 36. This can also be carried out by the supply apparatus 38. By means of the conveying apparatus 36, the coated workpiece is transported to a common output measuring station 50, in which the coated surface of the workpiece is measured. After this final measurement in the output measuring station 50, the workpiece is placed back onto the main conveying apparatus 60, by means of which the workpiece can be conveyed to further processing. The workpiece can likewise be transferred from the conveying apparatus 36 into the output measuring station 50 and again to the main conveying apparatus 60 by a handling apparatus 32 in the same way as on the input measuring station 40, but this is not shown in FIG. 1.

The measured values determined in the input measuring station 40 for a specified workpiece are transmitted to a central control apparatus. By means of the control apparatus, the conveying apparatus 36 is also controlled by the relevant supply apparatus 38 such that the measured workpiece is guided to a specified coating module 20 in the module group 30. At the same time, the measured values for the specified workpiece are forwarded to the selected or specified coating module 20 by the control apparatus, such that the workpiece can be coated depending on the input measured values. After the coating, the workpiece is measured in the box-shaped output measuring station 50, the determined measured values likewise being forwarded to the central control apparatus and to the data set for the specified workpiece. A comparison of the input measured values and the output measured values as well as the coating parameters can be carried out in the control apparatus in order to determine whether a coating has been correctly carried out. If necessary, operating parameters of a coating module 20 can be readjusted by the control apparatus during the coating.

Figure 2:
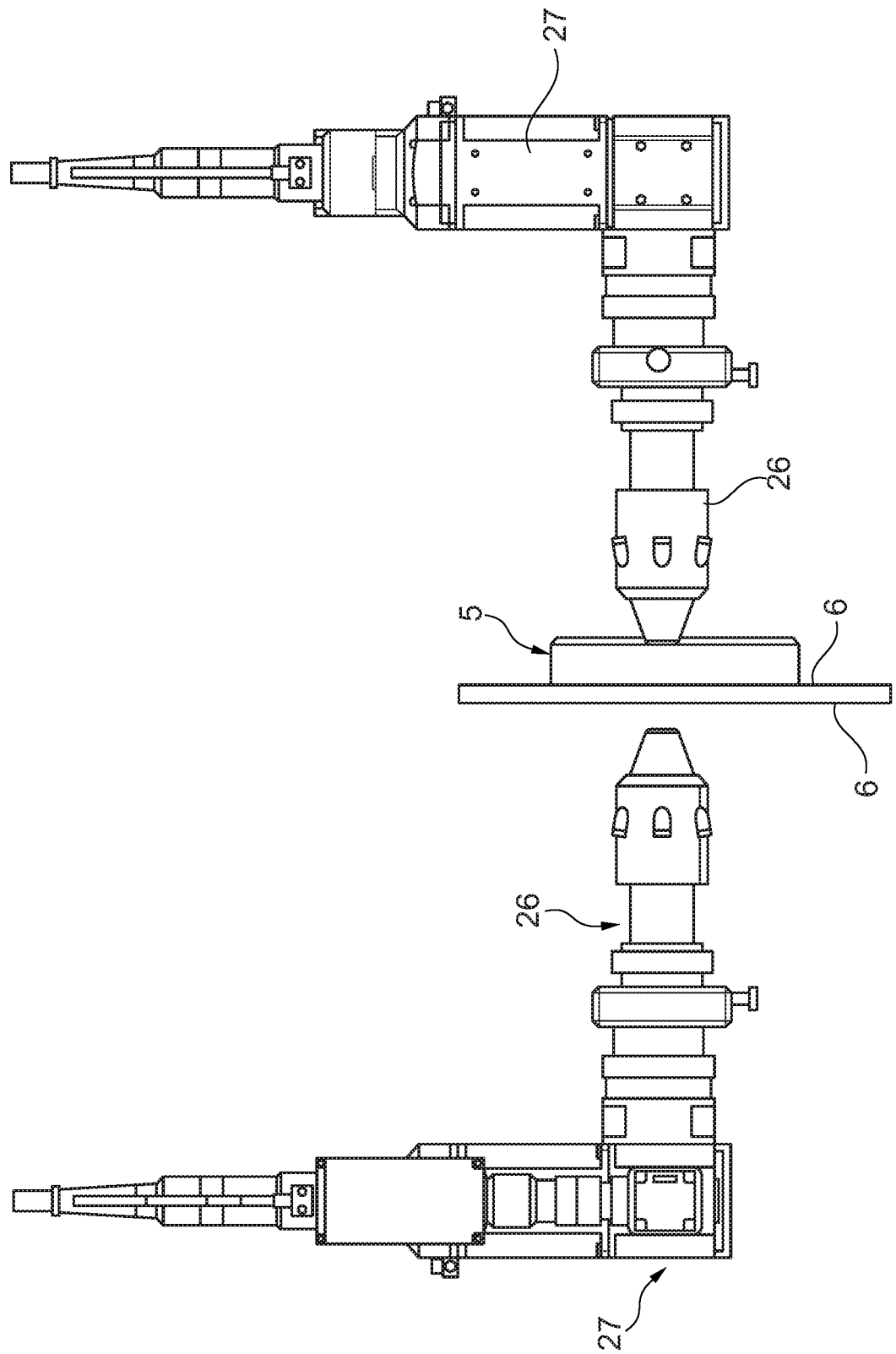
FIG. 2 is a schematic view for coating a workpiece.

According to FIG. 2, a disc-shaped element can be provided as a workpiece 5 to be coated, in particular a brake disc having one or two surfaces 6 to be coated. The metal coating can be applied by a coating nozzle 26, by means of plasma coating or laser deposition welding. The coating nozzle 26 is arranged on a carrier 27. In plasma spraying, metal particles are melted in an arc and are applied to the surface 6 at high speed. In deposition welding, coating material, in particular a metal powder, is initially applied and then locally melted by means of a laser. In the process, the coating can be carried out in multiple steps and multiple layers. In particular, the layers can also be applied with different layer thicknesses, different materials and different methods in order to achieve desired properties, in particular in terms of adhesion, abrasion resistance and/or corrosion resistance.

In principle, it is possible to carry out the coating using a coating nozzle 26, which is moved along the surfaces 6 to be coated by means of the carrier 27. Besides a plasma spraying and/or a laser deposition welding, other thermal metal coating methods may also be used as alternatives or in combination with one another.

Figure 3:
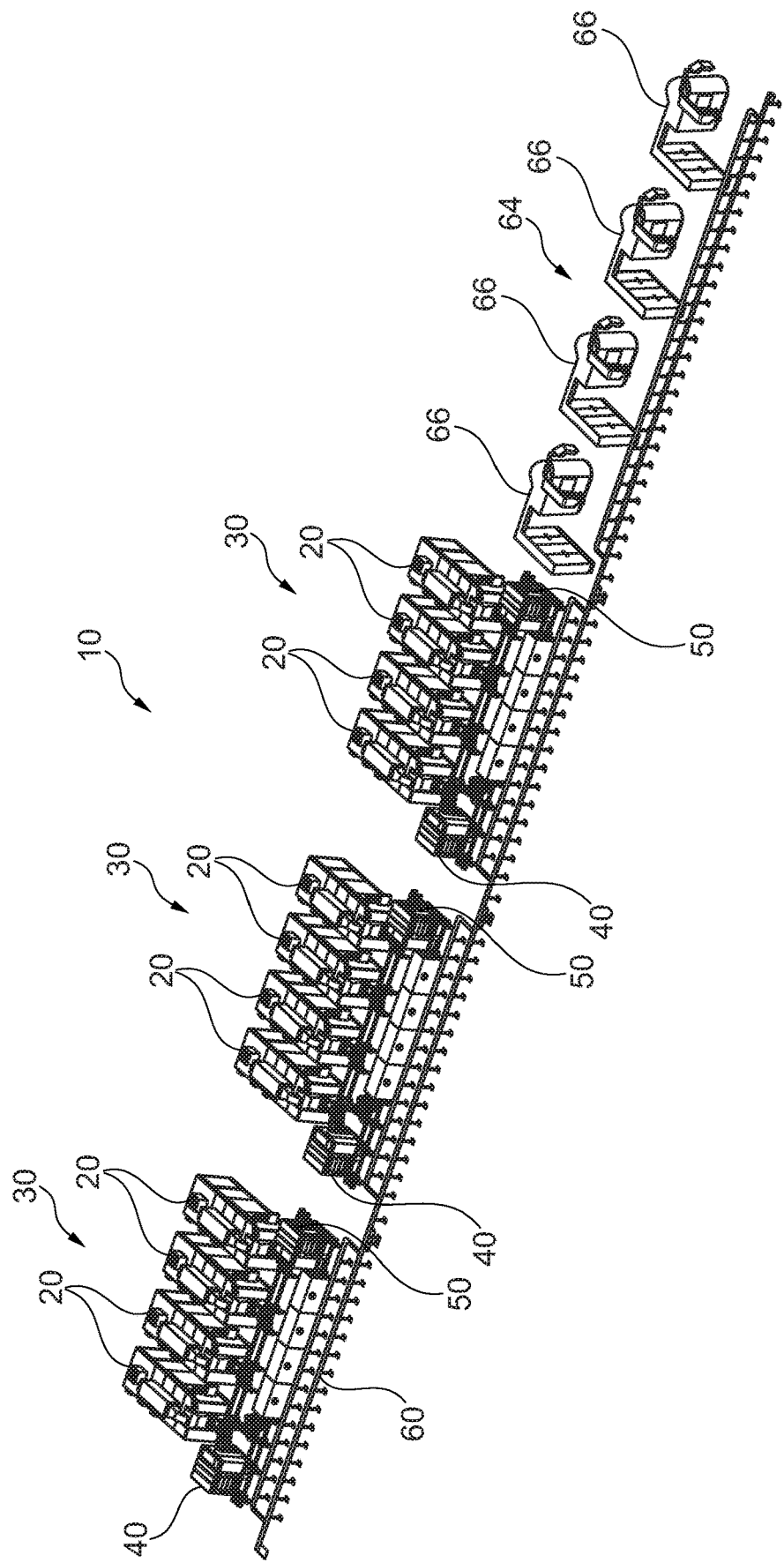
FIG. 3 is a perspective view of another system according to the invention comprising a plurality of module groups according to FIG. 1.

A development of a system 10 according to the invention comprising a total of three module groups 30, which are each made up of four coating modules 20, is shown in FIG. 3. Here, the individual module groups 30 are designed according to the embodiment in FIG. 1, with an input measuring station 40 and an output measuring station 50 being assigned in each module group 30.

The total of three module groups 30 are arranged along a linear main conveying apparatus 60, such that, in this parallel arrangement, workpieces can be processed in parallel in the individual module groups 30 and in the individual processing modules 20. After passing through the respective output measuring station 50, a workpiece which has finished being coating is guided back to the main conveying apparatus 60, by means of which the workpiece is fed to a post-processing station 64.

In the embodiment shown according to FIG. 3, the post-processing station 64 comprises a total of four grinding devices 66 arranged in parallel. By means of the grinding devices 66, the at least one coated surface of the workpiece can be processed and ground as a final step. In order to ensure efficient post-processing, the detected measured values for each workpiece can be forwarded to the specified grinding device 66 in the post-processing station 64 which has been selected by the control apparatus for processing the workpiece. Depending on the detected final height of the coated surface of the workpiece, for example, the grinding tool can thus be efficiently advanced towards the workpiece in the respective grinding device 66.

It can be seen in particular from the embodiment according to FIG. 3 that even for larger increases in capacity that are potentially required, not only individual coating modules 20 but also whole module groups 30 which each comprise a plurality of coating modules 20 and associated input measuring stations 40 and output measuring stations 50 can be readily added to a total system.

The invention claimed is:

1. A system for coating brake discs or brake drums, using a coating device for applying a metal coating to a surface (6) of one of the brake discs or brake drums (5), the system comprising:
a plurality of coating devices for applying the metal coating as a metal brake surface onto the brake discs or brake drums, wherein the plurality of coating devices are identical coating modules (20), and are arranged in a module group (30),
an input measuring station (40) associated with the module group (30), by means of which station a structure of the surface of the face (6) of the one of the brake discs or brake drums (5) to be coated can be detected prior to any of the coating devices applying the metal coating to the one of the brake discs or brake drums, a conveying apparatus (36), by means of which the one of the brake discs or brake drums (5) can be supplied to one of the coating modules (20) from the input measuring station (40), a control apparatus to control one of the coating modules when the metal coating is being applied to the one of the brake discs or brake drums depending on the measured values of the one of the brake discs or brake drums which have been detected in the input measuring station, and an output measuring station (50) associated with the module group (30), by means of which station a surface of the coated face (6) of the one of the brake discs or brake drums (5) can be detected;

the system further comprising:

a plurality of the module groups (30) each having an input measuring station (40) and an output measuring station (50), wherein the plurality of the module groups are arranged in parallel with one another; and a post-processing station (64) associated with the plurality of the module groups (30), wherein the post-processing station is designed for a material-removing processing of the coated surface of the one of the brake discs or brake drums, the material-removing process including grinding, honing, lapping, or polishing of the coated surface of the one of the brake discs or brake drums.

2. The system according to claim 1, wherein the conveying apparatus (36) comprises a linear conveyor, along which the individual coating modules (20) are arranged.

3. The system according to claim 2, wherein in a conveying direction of the linear conveyor, the input measuring station (40) is upstream of the module group (30) and the output measuring station (50) is downstream of the module group (30).

4. The system according to claim 1, comprising at least one handling apparatus (32) including a multi-axis gripper, by means of which the one of the brake discs or brake drums (5) can be supplied to the input measuring station (40) and/or to the conveying apparatus (36) and/or to the output measuring station (50).

5. The system according to claim 1, wherein the control apparatus controls the conveying apparatus (36) to supply a particular one of the brake discs or brake drums (5) to a particular one of the coating modules (20), and to control the particular one of the coating modules (20) when the metal coating is being applied to the particular one of the brake discs or brake drums (5) depending on the measured values of the particular one of the brake discs or brake drums (5) which have been detected in the input measuring station (40).

6. The system according to claim 1, wherein each coating module (20) comprises a transport frame (22) and is arranged interchangeably in the module group (30).

7. The system according to claim 1, wherein the coating modules (20) in a module group (30) are arranged in parallel with one another.

8. The system according to claim 1, comprising a main conveying apparatus (60) for supplying the brake discs or brake drums (5) to the module group (30) and for discharging said brake discs or brake drums therefrom.

9. The system according to claim 1, wherein the control apparatus is for controlling the post-processing station (64) on the basis of measured values of the coated one of the brake discs or brake drums (5), which have been detected by the output measuring station (50) through which the one of the brake discs or brake drums (5) has passed.

10. Method for coating workpieces (5), in particular brake discs or brake drums, using a system (10) according to claim 1, wherein the workpiece (5) to be coated is supplied to an input measuring station (40), in which a surface of a face (6) of the workpiece (5) to be coated is detected, the workpiece (5) is guided to one of the coating modules (20) in a module group (30) by means of a conveying apparatus (36), in which module group a metal coating is applied to the surface (6) of the workpiece (5) to be coated, and the coated workpiece (5) is supplied to an output measuring station (50), in which the coated surface of the workpiece (5) is detected.

11. The system according to claim 1, wherein the control apparatus is for controlling the post-processing station (64) on the basis of measured values of the coated one of the brake discs or brake drums (5), which have been detected by the output measuring station (50) through which the one of the brake discs or brake drums (5) has passed.

* * * * *